Patented Oct. 29, 1940

2,219,426

UNITED STATES PATENT OFFICE 2,219,426

FERMENTATION PROCESS FOR THE PRODUCTION OF BUTYL ALCOHOL AND OTHER SOLVENTS

James F. Loughlin, New York, N. Y.

No Drawing. Application May 9, 1938,
Serial No. 206,927

25 Claims. (Cl. 195—44)

This invention relates to processes for the production of normal butyl alcohol, acetone, isopropyl alcohol, carbon dioxide and hydrogen by the fermentation of fermentable carbohydrate material of the class consisting of starchy and sugary materials, including starch and starch-bearing materials, and sugar and sugary materials, such as corn-meal, potato, beet molasses, cane molasses, sugar syrups, whey, and syrup materials containing saccharified substances derived from carbohydrates. An object of the invention is the provision of a fermentation process of the kind referred to which shall efficiently utilize such fermentable carbohydrate material to produce high yields of the solvents, butyl alcohol, acetone and isopropyl alcohol.

The process in accordance with the present invention comprises preparing a suitable fermentable carbohydrate mash, providing suitable non-toxic buffering material to insure normal acidity during the fermentation, providing suitable assimilable nitrogenous nutrient for the bacteria which serves to accelerate the fermentation and increase the solvent yields, inoculating the mash with a culture of the hereinafter described species which I have named Clostridium saccharobutyl-isopropyl-acetonicum-beta, fermenting the mash at a temperature between about 25° C. and 40° C. and separating the solvents from the non-solvent material.

The species of bacteria used is spore-forming and anaerobic and can be found in soil and therefor in materials which are grown in or near the soil, such as potatoes.

The organisms of this species may be cultured repeatedly in sugar and/or starch media without harmful effects. For example, sugar mashes such as molasses, and starch mashes, such as corn-meal and potato may be used with added calcium carbonate and ammonia type nitrogen. In order to obtain satisfactory fermentations and yields (30% or more) of solvents on commercial carbohydrate mashes, I have found that it is essential to supply ammonia type nitrogen such as degraded protein, urea, ammonia or ammonium compounds. Furthermore, I have found that it is also essential to provide in the mash ample non-toxic buffering material, such as calcium carbonate, in order to insure the desired normal acidity during the fermentation. I have found that the organisms of this species are incapable of fermenting a commercial 5% or more sugar mash of blackstrap cane molasses to consistently produce solvent yields of 30% or more unless ammonia type nitrogen is added to the mash. The organisms of this species produce amylase and therefore they are capable of fermenting starch meshes. They are however incapable of liquefying gelatin.

This species organism may be isolated by methods well known in the art; for instance, by the method described in U. S. Patent 1,992,921, followed by selective culturing in a glycerol-peptone synthetic medium.

In order to facilitate the identification of this species of organism, a description thereof will be given with the aid of the Descriptive Chart of the Society of American Bacteriologists.

Name: "Clostridium saccharobutyl - isopropyl acetonicum-beta"

Source: Potato

By "a culture of an organism of the species Clostridium saccharobutyl-isopropyl-acetonicum-beta," I mean an organism, pure cultures of which have the following identifying characteristics:

I. Morphology

1. Vegetative cells, motile.
    Medium used—potato and dextrose.
    pH of medium—approximately 7.0 at time of inoculation.
    Age—18 hours.
    Temperature—34–36° C.
    Form—long and short rods; chain formation.
    Size—2–14 microns long } unstained.
        .7–2.0 microns wide
    Ends—rounded.
2. Sporangia.
    Medium used—potato and dextrose.
    pH±7.0 at time of inoculation.
    Age—48 hours.
    Form—club and spindle shaped.
3. Endospores—terminal to central, chiefly subterminal; unstained.
    Form—oval to cylindrical.

II. Cultural features

1. Nutrient agar stab.
   Age—5 days.
   Temperature—34–36° C.
   Growth—none aerobically.
   Growth—fair anaerobically.
   Color—cream.
   Odor—none observed.
2. Potato slant.
   Age—24 hours.
   Temperature—34–36° C.
   Growth—none aerobically.
   Growth—moderate anaerobically in 4 days.
   Form—echinulate.
   Elevation raised.
   Luster—glistening.
   Optical character—opaque.
   Color—cream.
   Odor—butylic.
   Surface—smooth.
   Consistency—slimy.

III. Physiology

1. Optimum temperature for rapid cell growth=30–40° C.
   Optimum temperature for high solvent production=27–35° C.
2. Optimum pH of cane molasses medium for solvent production, initial=approximately 4.7–7.0; final=approximately 4.6–6.5.
3. Gelatine stab.—No liquefaction in 30 days. Incubation temperature 34–35° C.
4. Anaerobic organism.
5. Products produced by fermentation of cane molasses mash.
   Normal butyl alcohol=approx. 60–85%.
   Acetone=approx. 15–40%.
   Isopropyl alcohol=approx. 0.1–4.0% and usually 0.5–2.5.%.
   $CO_2$=approx. 60–65% by volume.
   $H_2$=approx. 35–40% by volume.
6. Fermentation tests: (as indicated by gas evolution)
   Medium used: 1% carbohydrate concentration with peptone and the usual inorganic salts;
   Positive fermentation within 30 days at 35–37° C. arabinose, dextrin, galactose, glucose, glycerol, insulin, lactose, levulose, maltose, mannose, mannitol, soluble starch, sucrose, xylose.
   Negative fermentation within 30 days at 35–37° C., cellulose, rhamnose.

Pure cultures of this species organism can be readily distinguished from pure cultures of an organism of the species "Clostridium saccharobutyl-acetonicum," described in U. S. Patent 1,992,921, by the difference in the solvents produced and by the difference in the fermentation of glycerol. They respond to the same stimulants, e. g. urea and ammonia type nitrogen compounds, and to pH control, as do pure cultures of the Clostridium saccharobutyl-acetonicum species.

Pure cultures of this species organism can likewise be distinguished from pure cultures of an organism of the species "Clostridium saccharobutyl-isopropyl-acetonicum," described in my Patent No. 2,096,377 issued October 19, 1937, by the wide difference in the ratios of solvents produced by these two species of organisms. An organism of the species "Clostridium saccharobutyl-isopropyl-acetonicum," depending upon conditions such as pH of medium and kind and quantity of assimilable nitrogen-containing materials used, may produce widely varying amounts of acetone and isopropyl alcohol. Under the same conditions the hereindescribed species of organism is incapable of producing any very substantial amount of isopropyl alcohol, usually producing a solvent mixture containing from about 0.5% to about 2.5% of this solvent.

The gelatin liquefaction test was made on a 10.8% "Bacto-nutrient gelatin" solution containing 0.25 grams of glucose per 100 cc. of the solution. "Bacto-nutrient gelatin" is a nutrient material comprising 3 parts beef extract, 5 parts peptone and 100 parts gelatin. The tests were made with active 20 hour cultures. The tubes gassed well, but no liquefaction was observed even after 30 days incubation at about 34 to 36° C.

Pure cultures of this species organism are incapable of readily and actively fermenting sterile starch mashes consisting solely of corn-meal and water to produce any substantial amount of solvent products. They will, however, as stated herein ferment starch. They do, therefore, produce amylase, although solvent yields, as disclosed herein, are much more substantial from sugar mashes than from starch mashes.

The spores of this species organism are heat-resisting being capable of withstanding heating for about 15 minutes at about 85° C., although they are incapable of withstanding a temperature of 100° C. for 30 minutes and normally will not withstand 100° C. for 5 minutes.

Of the various characteristics recited herein, the following primary characteristics are most important for purposes of identifying pure cultures of these anaerobic spore-forming butyl alcohol producing bacteria:

1. Capable of fermenting 5% sugar mashes, aided as described herein, to produce over 30% by weight of the sugar as solvents composed of chiefly n-butyl alcohol, with a smaller amount of acetone and with a still smaller amount of isopropyl alcohol.
2. Incapable of fermenting cereal-starch mashes unaided, to produce any substantial amount of butyl alcohol, acetone and isopropyl alcohol.
3. Capable of fermenting cereal-starch mashes with added ammonia type nitrogen and an excess of finely pulverized calcium carbonate to produce an appreciable amount of butyl alcohol, acetone and isopropyl alcohol.
4. Incapable of liquefying gelatin.
5. Give a positive bacteriological fermentation test for glycerol, starch, and sucrose as evidenced by gas evolution.

The following typical fermenting procedures are mentioned as illustrative of the invention, but it is to be understood that other conditions, other materials, other volumes of inoculant, and other sugary materials may be used:

Example 1

Sterile mash of 50% cane and 50% beet molasses and water.
Approximate sugar concentration=5.0%.
Malt sprouts added=0.13% by weight of mash.
Ammonium sulphate added=.035% by weight of mash (as $NH_3$).
100% sulphuric acid added=.011% by weight of mash.
Volume inoculant=2.5% active culture.
Solvent yield=approximately 34% of sugar.
Solvent yield=approximately 75.0% of butyl alcohol.
Solvent yield=approximately 23.8% of acetone.

Solvent yield=approximately 1.2% isopropyl alcohol.
pH at start=approximately 5.6. Temperature of fermentation 35-30° C.
pH at finish=approximately 6.0.
Fermentation period=72 hours.

*Example II*

Sterile mash of 75% cane and 25% beet molasses and water.
Approx. sugar concentration=5.0%.
Malt sprouts added=0.26% by weight of mash.
Ammonium sulphate added=0.043% by weight of mash (as NH₃).
Powdered CaCO₃ added=0.19% by weight of mash.
Volume of inoculant=2.5% active culture.
Solvent yield=approx. 29% of sugar.
Solvent yield=approx. 76.2% butyl alcohol.
Solvent yield=approx. 23.3% acetone.
Solvent yield=approx. 0.5% isopropyl alcohol.
pH at start=approx. 5.9.
pH at finish=approx. 5.5.
Temperature of fermentation=35-30° C.
Period of fermentation=65 hours.

*Example III*

Sterile mash of 80% cane and 20% beet molasses and water.
Approx. sugar concentration=5.0%.
Malt sprouts added=0.13% by weight of mash.
Ammonium sulphate added=.043% by weight of mash (as NH₃).
100% sulphuric acid added=.055% by weight of mash.
Volume of inoculant=2.5% active culture.
Solvent yield=approx. 28.5% of sugar.
Solvent yield=approx. 63.3% butyl alcohol.
Solvent yield=approx. 36.2% acetone.
Solvent yield=approx. 0.5% isopropyl alcohol.
pH at start=approx. 4.9-5.0.
pH at finish=approx. 4.9-5.0.
Temperature of fermentation=35-30° C.
Period of fermentation=75 hours.

*Example IV*

Sterile mash of 75% cane and 25% beet molasses and water.
Approx. sugar concentration=5.1%.
Malt sprouts added=0.24% by weight of mash.
Ammonium sulphate added=.053% by weight of mash (as NH₃).
No acid or alkaline material added.
Volume of inoculant=2.5% active culture.
Solvent yield=approx. 32.0% of sugar.
Temperature of fermentation=approx. 36-30° C.
Period of fermentation=72 hours.

*Example V*

Sterile mash of 100% cane molasses and alcohol distilling slop.
Approx. sugar concentration=4.0% (exclusive of carbohydrate in slop used).
pH value adjusted with Na₂CO₃ to approx.=5.60.
Ammonium sulphate added=.04% by weight of mash (as NH₃).
Powdered CaCO₃ added=0.3% by weight of mash.
Volume of inoculant=2.5% active culture.
Solvent yield=approximately 40.4% of sugar in added molasses.
Temperature of fermentation=34°-30° C.
Period of fermentation=70 hours.

*Example VI*

Sterile mash 7% corn-meal and water.
Ammonium sulphate added=.2% by weight of mash.
Solvent yield=approx. 0.80 grams per liter of mash.
Final pH=approx. 4.30.
Fermentation temperature=34-30° C.

*Example VII*

Sterile mash 6.3% corn-meal and water.
Ammonium sulphate added=0.19% by weight of mash.
Powdered CaCO₃ added=0.19% by weight of mash.
Solvent yield=10.10 gram per liter of mash.
Final pH=approx. 5.20.
Fermentation temperature=34°-30° C.

*Example VIII*

Sterile mash 6.7% corn-meal and water.
Ammonium sulphate added=0.19% by weight of mash.
Ca(H₂PO₄)₂H₂O added=0.09% by weight of mash.
K₂CO₃ added=0.06% by weight of mash.
Malt sprouts added (at 90° C.)=0.48% by weight of mash.
Solvent yield=approx. 3.00 grams per liter of mash.
Final pH=approx. 4.60.
Fermentation temperature=34°-30° C.

*Example IX*

Sterile mash 6.7% corn-meal and water.
Beet molasses added=2.35% by weight of mash.
Solvent yield=12.60 grams per liter of mash.
Final pH=4.60.
Fermentation temperature=34°-30° C.

*Example X*

Sterile mash 7.0% corn-meal and water.
Ammonium sulphate added=0.17% by weight of mash.
Ammonium tartrate added=0.013% by weight of mash.
Ca(H₂PO₄)₂H₂O added=0.09% by weight of mash.
Powdered CaCO₃ added=0.20% by weight of mash.
Solvent yield=approx. 15.30 grams per liter of mash.
Final pH=approx. 5.0.
Fermentation temperature=34°-30° C.

*Example XI*

Sterile mash 5% sugar concentration—50% beet molasses—50% "Hydrol" (corn sugar or dextrose syrup) and water.
Ammonium sulphate added=0.03% by weight of mash (as NH₃).
Malt sprouts added=0.15% by weight of mash.
Solvent yield=approx. 32.5% of sugar.
Final pH=approx. 5.70.
Fermentation temperature=34°-30° C.

*Example XII*

Sterile mash 100% cane molasses approx. 5% sugar concentration.
Ammonium sulphate added=.07% by weight of mash (as NH₃).
Finely ground calcium carbonate added=.3% by weight of the mash.
Solvent yield=33.8% of sugar.
Final pH=approx. 5.5.
Period of fermentation about 60 hours.
Fermentation temperature=34°-30° C.

In order to obtain solvent yields of 30% or more with commercial mashes of at least 5% fermentable carbohydrate concentration, it is not always necessary to add organic protein-containing materials, such as malt sprouts or other degraded organic protein, cane molasses mashes containing over about 10% of beet molasses will usually be found to contain sufficient assimilable organic proteins. It is essential, however, to supply a small amount of ammonia type nitrogen or urea in order to obtain rapid fermentations with solvent yields of over 30% by weight of the sugar from commercial mashes of 5% or more carbohydrate concentration. With cane molasses containing a high ratio of beet molasses less ammonia-type nitrogen will be required than with 100% cane molasses mashes. Such use of normal alkaline, high protein content, highly buffered, beet molasses will also require less use of non-toxic alkaline materials, such as calcium carbonate. For example, mashes composed of 50% beet molasses and 50% cane molasses give satisfactory results without any added alkaline material. They may even give excellent solvent yields with a small addition of non-toxic acids such as lactric, acetic, sulphuric, phosphoric and other acids. Calcium carbonate may be added to such mashes, however, provided it is not unduly or artificially agitated during the fermentation. In this way a considerable amount of calcium carbonate in excess of the amount required to neutralize the natural acidity of the mash may be used with good results. In using calcium carbonate, I prefer to use very finely ground rather than coarsely ground material. In general, the more finely it is ground, the less required. I prefer to use finely ground calcium carbonate as the non-toxic alkaline material with 100% cane molasses mashes. However with a highly acid mash such as one of 100% cane molasses containing a considerable volume of ethyl alcohol distillery slop, I prefer to use both calcium carbonate and a soluble non-toxic alkaline material such as sodium or potassium hydroxides and/or carbonates. Ammonia or ammonium hydroxide and carbonate may likewise be used since it not only neutralizes the acids but it furnishes desirable ammonia type nitrogen.

In using distillery slops, the amount used in making up the mash can be widely varied depending upon the amount available and the type of carbohydrate mash used. Simple laboratory experiments will readily give this information. Such simple laboratory experiments will also readily determine the quantity of ammonia type nitrogen and non-toxic alkaline material (if any) required with any particular type of fermentable carbohydrate mash.

In the above described fermentations the mashes were fermented at from about 36° C. or 34° C. down to about 30° C.

Satisfactory yields of solvents can be obtained by fermenting at temperatures below 30° C., for instance 25-30° C., but usually, with other conditions similar, such fermentations are of longer duration than those conducted above 30° C. The fermentation can be carried out at temperatures as high as 40° C.

After the mash is sterilized or prepared for inoculation it is not absolutely necessary to prevent air from coming in contact with the mash, but it is desirable that the mash be substantially free of dissolved oxygen.

In carrying out this bacterial fermentation process and to insure the best results, it is obvious to those skilled in the art that care should be exercised in order to avoid the possibility of contaminating the medium after sterilization has been accomplished and particularly prior to and during the moment of inoculating.

The titratable acidity of the mash during fermentation corresponds closely to that of *Clostridium saccharobutyl-acetonicum* described in U. S. Patent 1,992,921.

In all titrations for acidity or alkalinity, litmus paper was used as the indicator.

When the best yields of solvents are obtained with molasses mashes, and using pure cultures of this species of organism, the final fermentation acidity is usually below about 2.7 cc. of titratable tenth normal acid per 10 cc. of mash. This corresponds to pH values of between about 4.7 and 6.2 and usually these final pH values are from about 4.8 to 6.0 depending upon the raw materials used, the make up of the mash, the sterilization of the mash, and the temperature of fermentation.

As this species organism is incapable of liquefying gelatin, it is obvious that the complex proteins which occur in gelatin are not utilized. It is thus preferable when adding organic protein to add simple proteins such as degraded or hydrolyzed protein matter to promote and sustain cell growth and the desired functioning of the organisms.

Various organic nutrients of vegetable or animal origin, such as may be derived from (by hydrolysis or degradation, if necessary) potato, corn gluten, rye, barley, wheat, rice, beet pulp, soy bean meal, cottonseed meal, copra meal, linseed meal, malt sprouts, slaughter house tankage, casein, glue, sewerage sludge, bone meal, ethyl alcohol slop including separated yeast water, fermentation slop, and other protein-containing materials as well as amino acids and urea, can be used.

Substances containing ammonia type nitrogen such as ammonia and the sulphate, carbonate, bicarbonate, chloride, phosphates, acetate, butyrate, hydroxide and lactate of ammonium as well as urea have a marked effect on the fermentation in that the fermentation is completed in less time, in that the consumption of carbohydrate material is increased, and in that the split-up of solvents or ratio of butyl alcohol to acetone in the produced solvent is apparently changed. Proportionately more acetone and less butyl alcohol are usually produced (particularly with the mineral acid salts of ammonium), when sufficient ammonia type nitrogen-containing substances are present. Small amounts of water-soluble substances containing ammonia type nitrogen are used, say about 0.0002% to 0.1% by weight of the mash (as ammonia), or even more. The term "small amount" as used in the specification and claims in connection with water-soluble ammonia type nitrogen-containing substances, refers to quantities of this magnitude. Quantities within the range 0.005 to 0.1% generally are employed. For example, mashes containing no added ammonia type nitrogen have produced mixed solvents containing as high as 75% to 85% butyl alcohol. A similar mash which contained ammonia type nitrogen was fermented under similar conditions and the solvents produced contained about 65% to 75% butyl alcohol and a correspondingly greater amount of acetone. The time required to complete the fermentation may be shortened in this manner by from about 6 to 36 hours. In order to simplify and economize plant operation I prefer to add such ammonia type nitrogen-containing materials prior to sterilization. However, good results may be obtained by adding part or all of said ammonia type nitrogen-containing materials shortly after fermentation has started and preferably within 24 hours of the time of inoculation.

A desirable acidity for the mash at the time of inoculation is a slight acidity to litmus, i. e. from zero or about 0.1 cc. to 2.5 cc. of titratable tenth normal acid per 10 cc. of mash. This corresponds to a hydrogen ion concentration of about 4.5 or 4.8 to about 6.7, but with some types of mashes, the pH value of the mash may be 7.5 or even higher. Mashes with more or less acidity may preferably, although not necessarily, be adjusted prior to inoculation, by adding an acid, such as sulphuric, hydrochloric, lactic, butyric or phosphoric acid, or by adding a base, such as ammonia or hydroxide or carbonate of ammonium or of an alkali or an alkaline earth metal. In the best typical yields with sterile mashes and pure cultures the titratable acidity does not exceed an equivalent of about 3.5 cc. of tenth normal sodium hydroxide per 10 cc. of mash during fermentation. The titratable acidity in such sterile mashes of cane molasses rarely exceeds about 3.2 cc. of tenth normal acid per 10 cc. of mash.

The carbohydrate material can be economically utilized and good yields of solvents can be produced in mashes which have a concentration of carbohydrate material of up to about 8% or even more of the weight of the mash.

By conducting fermentations with this species organism in the manner described herein, about 85% to 95% of total sugar in the original mash can be consistetly consumed with carbohydrate concentrations of about 4.0 to 5.5%. With carbohydrate concentrations of about 6.0 to 7.0%, carbohydrate consumptions of from 80 to 90% can be consistently obtained. Solvent yields are usually about 34 to 38% of carbohydrate fermented.

In order to obtain consistently high solvent yields with this species of organism, I have found that it is essential that ample assimilable protein be available. Such protein should be of a hydrolyzed or degraded nature.

In general the pH value of the mash during fermentation may vary from about 4.5 to 7, but for best yields I prefer the more limited range from about 4.8 to 6.5. I have further found that, at least with certain strains of the species of bacteria with which I have worked, it is preferable not to add alkaline material after the mash has been inoculated. In the foregoing examples no materials of any kind were added to the mashes after they were inoculated. I have further found that pure cultures of the above described species of organism, when inoculated into suitably adjusted and prepared mashes, are able to bring about a lowering in the acidity of the mash after about 12 to 24 hours depending upon the rapidity of the fermentation pick-up. The species of organism described herein is capable, with certain molasses mashes, of causing the mash to have a higher pH value after the fermentation than at the time of inoculation. Example 1 above illustrates this phenomenon. With molasses mashes, the best yields of solvents generally are obtained when the final pH value is between about 4.5 and 6.3, or more specifically 4.7 and 6.1.

The pH value for optimum yields of solvents may vary somewhat depending upon the character of the molasses mash. With 100% cane molasses mashes of say 5% to 8% sugar concentration it is usually desirable to add a small amount of acid neutralizing material; for instance, calcium carbonate, or ammonia, or other equivalent alkaline material as referred to hereinbefore, preferably an insoluble non-toxic material such as calcium carbonate. The amount to be added will depend on the alkaline material used and on the natural acidity of the particular raw materials used. Obviously with the insoluble materials a considerable excess may be used without harmful effects. It is well known that the acidity of molasses varies widely. However, if the pH value at the beginning of fermentation are adjusted within the specified values, very good results will be obtained.

In order to obtain the best solvent yields and the most rapid fermentations particularly with cane molasses mashes it is essential to add ammonia type nitrogen-containing material, such as ammonia or ammonium compounds. Urea may likewise be used. Small amounts are used, say about 0.0002% to 0.1% (preferably 0.01% to 0.1%) by weight of the mash (as ammonia) or even more, depending on the type and concentration of sugary materials used. For example, with a 6.5% sugar concentration of molasses mash, proportionately more of such inorganic nitrogen-containing products will be used than with a 4% sugar mash containing the same sugary materials.

In the use of one particular strain of the herein-described species organism I have found that, although pure cultures of said strain give a positive bacteriological fermentation test for sucrose, for the highest solvent yields it is desirable to invert the sucrose, as well as to degrade the protein, before attempting to ferment such sucrose-containing mashes. This can be conveniently done in preparing the mash by acidification and heating followed by neutralization of the excess acid with ammonia, calcium carbonate, ammonium hydroxide, or other alkaline materials.

I have also found that in preparing an inoculum, containing an organism of the hereindescribed species, it is likewise desirable to have such inoculum mash prepared in the same general manner, although not necessarily identical, as described herein for the final mash. Although I prefer to use active cultures in the final inoculum, sporulated cultures may be used with good results.

I have also found that with some types of sugary raw materials, such as Cuban cane molasses, low pH values, that is pH values below about 5.3, apparently cause a somewhat higher ratio of acetone to butyl alcohol to be produced. The isopropyl alcohol production, however, does not increase substantially over the amount stated herein. With some carbohydrate mashes it is desirable and beneficial to add small amounts of inorganic salts, such as the carbonates, phosphates, chlorides and sulphates of calcium, sodium, potassium, iron, manganese and magnesium. Usually it is unnecessary to add an amount of any of these inorganic salts in excess of about 0.5% by weight of the mash.

The term "mash" in the specification and claims refers to solutions containing carbohydrate material, as well as to mixtures which contain solids and water.

The term "fermentable carbohydrate material" in the specification and claims refers to carbohydrates including starch and sugars, such as sucrose, dextrose, levulose and maltose, and to hydrolyzed carbohydrate materials which resemble sugars, such as dextrine, inulin and the syrups occurring as residues in the manufacture of corn sugar, which syrups contain principally dextrose and/or dextrine.

Although the invention has been explained with reference to various specific examples, it is to be understood that it is not specifically limited thereto. For example, organic nutrients (preferably degraded or hydrolyzed) can be added to or excluded from any of the described mashes; mashes containing other fermentable carbohydrate substances can be used; variations in the described optimum conditions can be made as these conditions are affected by changes in the concentration and kinds of raw materials used to make the mashes, and the concentration of the carbohydrate substance in the mash can be varied within broad limits.

This application is a continuation-in-part of my application Serial No. 55,925, filed December 23, 1935.

I claim:

1. The method of manufacturing normal butyl alcohol, acetone and isopropyl alcohol which comprises inoculating a carbohydrate mash of the class consisting of starchy and sugary mashes having a pH value between about 4.5 and about 7.5, said mash comprising essentially a water solution of a fermentable carbohydrate material and degraded protein, with a bacterial culture containing an organism of the species Clostridium saccharobutyl-isopropyl acetonicum-beta described herein and allowing the mash to ferment at a temperature between 25° C. and 40° C. by the action of said culture.

2. The method as defined in claim 1 in which the mash contains fermentable sugary material.

3. The method as defined in claim 1 in which the initial pH value of the mash is from about 4.5 to about 6.7.

4. The method as defined in claim 1 in which the initial pH value of the mash is from about 4.8 to about 6.7.

5. The method as defined in claim 1 in which from about .005% to about 0.1% calculated as ammonia on the weight of the mash of ammonia type nitrogen-containing material is added to the mash and the pH value of the mash prior to fermentation is from about 4.5 to about 7.5.

6. The method as defined in claim 1 in which from about .005% to about 0.1% calculated as ammonia on the weight of the mash of an ammonium compound is added to the mash and its pH value is adjusted prior to fermentation to from about 4.5 to about 7.5.

7. The method as defined in claim 1 in which the mash comprises molasses containing degraded protein and from about .005% to about 0.1% calculated as ammonia on the weight of the mash of ammonia type nitrogen-containing material is added to the mash and its pH value during the fermentation varies from about 4.5 to about 7.0.

8. The method as defined in claim 1 in which the mash contains molasses in which the poly- and di-saccharides have been inverted to monosaccharides.

9. The method of manufacturing butyl alcohol with a smaller amount of acetone and a still smaller amount of isopropyl alcohol which comprises inoculating a carbohydrate mash of the class consisting of starchy and sugary materials comprising essentially a water solution of a fermentable carbohydrate, with a culture of an anaerobic spore-forming bacterium of the species Clostridium saccharobutyl-isopropyl-acetonicum-beta, and allowing the mash to ferment by the action of said culture.

10. The method as defined in claim 1 in which the mash contains fermentable starch material.

11. The method as defined in claim 1 in which the mash contains water-insoluble non-toxic alkaline material.

12. The method as defined in claim 1 in which the mash contains finely divided calcium carbonate.

13. The method as defined in claim 1 in which the pH value of the mash is adjusted by the addition of acid.

14. The method as defined in claim 1 in which the mash contains ammonia type nitrogen and a water-insoluble non-toxic alkaline material.

15. The method as defined in claim 1 in which the mash contains ammonia type nitrogen and finely ground calcium carbonate.

16. The method as defined in claim 1 in which the fermentable carbohydrate comprises at least 10% of beet molasses sugars and the mash contains ammonia type nitrogen.

17. The method as defined in claim 1 in which the mash contains ethyl alcohol slop and ammonia type nitrogen.

18. The method as defined in claim 1 in which the mash contains ethyl alcohol slop, ammonia type nitrogen and a water-insoluble non-toxic alkaline material.

19. The method as defined in claim 1 in which the mash contains fermentation slop and ammonia type nitrogen.

20. The method as defined in claim 9 in which the mash contains ammonia type nitrogen and the pH value of the mash during fermentation is maintained at from about 4.5 to about 7.5.

21. The method as defined in claim 9 in which the mash contains ammonia type nitrogen and water-insoluble non-toxic alkaline material.

22. The method as defined in claim 9 in which the mash contains ammonia type nitrogen and finely divided calcium carbonate.

23. The method as defined in claim 9 in which the mash contains ammonia type nitrogen, fermentation slop and water-insoluble, non-toxic alkaline material.

24. The method as defined in claim 1 in which the mash contains separated yeast water.

25. The method as defined in claim 9 in which the mash contains separated yeast water.

JAMES F. LOUGHLIN.